US006755119B1

United States Patent
Lyall et al.

(10) Patent No.: US 6,755,119 B1
(45) Date of Patent: Jun. 29, 2004

(54) COFFEE SPRAY HEAD

(75) Inventors: Lucian H. Lyall, Coto De Caza, CA (US); Chris Enright, Ladera Ranch, CA (US)

(73) Assignee: Wilbur Curtis Company, Inc., Montebello, CA (US)

( * ) Notice: Subject to any disclaimer, the term of this patent is extended or adjusted under 35 U.S.C. 154(b) by 41 days.

(21) Appl. No.: 10/163,957

(22) Filed: Jun. 5, 2002

(51) Int. Cl.[7] .............................................. A47J 31/00
(52) U.S. Cl. ...................... 99/315; 99/299; 99/302 R
(58) Field of Search ........................ 99/315, 314, 312, 99/299, 304, 405, 306, 307, 302 R

(56) References Cited

U.S. PATENT DOCUMENTS

| 1,700,529 A | * | 1/1929 | Hempstead ................. 99/306 |
| 3,333,964 A | * | 8/1967 | Bender ......................... 99/299 |
| 4,354,427 A |   | 10/1982 | Filipowicz et al. |
| 4,426,920 A |   | 1/1984 | Phillips et al. |
| 4,771,680 A |   | 9/1988 | Snowball et al. |
| 4,858,523 A |   | 8/1989 | Helbling |
| 5,025,714 A |   | 6/1991 | Brewer |
| 5,168,794 A |   | 12/1992 | Glucksman |
| 5,477,775 A | * | 12/1995 | Delhom et al. ............... 99/299 |
| 6,148,717 A |   | 11/2000 | Lassota |
| 6,244,162 B1 | * | 6/2001 | Dahmen ...................... 99/315 |

* cited by examiner

Primary Examiner—Reginald L. Alexander
(74) Attorney, Agent, or Firm—Fulwider, Patton Lee & Utecht, LLP

(57) ABSTRACT

A spray head for a coffee making apparatus having a plurality of holes at the bottom of a fluid reservoir for wetting the coffee grounds located below the spray head, the holes raised above a floor of the fluid reservoir by upwardly projecting stand pipes. The elevated hole draws water from a depth spaced from the floor where sediment and lime scaling occurs to delay clogging of the spray head. The arrangement of the holes are selected to wet the grounds evenly, and the size of the holes are preferably selected to create an impact of droplets with the grounds below while maintaining an adequate flow rate through the holes.

10 Claims, 2 Drawing Sheets

SECTION B-B

SECTION A-A

DETAIL C

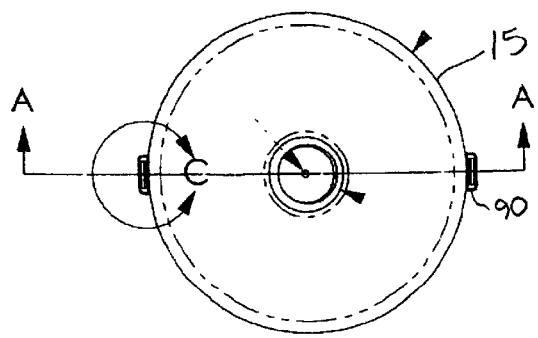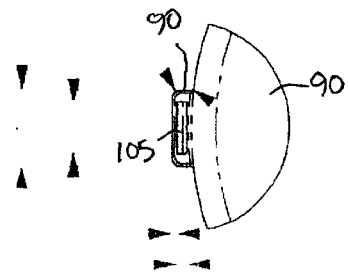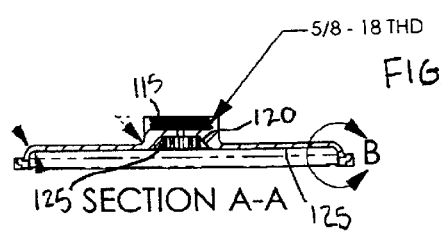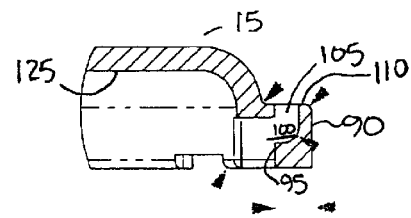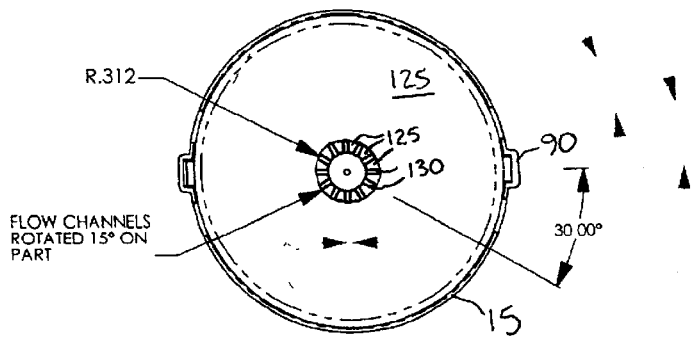

COFFEE SPRAY HEAD

BACKGROUND OF THE INVENTION

1. Field of the Invention

The present invention relates generally to a coffee making apparatus, and more particularly to a spray head for a coffee making apparatus having a plurality of raised holes on the interior surface of the spray head to resist clogging by deposition of lime and other sediments.

2. Description of the Related Art

Lixiviation is a general term for the passage of hot water through a ground product, where the hot water acts as a solvent. Coffee making machines use this technique to brew coffee. In a drip filtration system for brewing coffee, coffee grounds are placed in a basket and heated water is drained into the basket to mix with the grounds and extract flavoring solubles as the water is directed into a decanter positioned below the basket. A filter is placed between the grounds and the decanter to remove sediment and prevent the grounds from entering the beverage in the decanter.

Brewing the most flavorful coffee requires a balancing between the strength of the brewed coffee and the degree of extraction from the ground coffee. The coffee brewing process is made up of three stages: wetting, extraction, and hydrolysis. During wetting, as the coffee bean fiber absorbs hot water gas is driven from interstitial voids inside the coffee particles preparing the coffee particles for extraction of solubles. In the extraction stage, water-soluble flavoring compounds within the coffee bean fibers dissolve and enter the water. In the hydrolysis stage, large molecules of water-insoluble carbohydrates break down into smaller molecules that are water soluble.

To achieve uniform wetting and extraction, the hot water contacting the bed of ground coffee must preferably lift and separate the coffee grounds with a turbulent flow. Improperly applying the water to the grounds can contribute to a poorly brewed coffee. Conventional spray heads tend to concentrate the water flow in the center of the brew basket and do not disperse the grounds with an active attempt to create turbulence.

Another common problem in coffee making equipment such as a drip filtration system is liming, or scaling, caused by excessive hardness or mineral content of the water. Heating water containing these minerals causes the minerals such as lime to precipitate and form scale and sediment on the piping. The precipitate is especially problematic when it accumulates around the pores of the spray head to reduce the flow of the water. When the reduction in the level of flow reaches a critical level, the equipment must be serviced at significant cost, and the equipment cannot be used during this maintenance operation. Accordingly, for commercial purveyors of coffee who use such a system it would be preferable to prolong the periods between such maintenance if possible.

Another problem encountered by the drip filtration systems of the prior art is the inability of the spray heads to wet the grounds evenly and completely. Typically, the pores of the spray head are centrally disposed and the flow of water through the holes is concentrated about a central stream. When the stream comes in contact with the grounds, the grounds adjacent to the central stream tend to become saturated with the water while grounds further away from the central stream may not receive adequate exposure to the water. Even if the basket begins to fill with water, the peripheral grounds may be lifting by floating grounds below and only be partially wetted. This leads grounds that are over-saturated in some places and under-saturated in others, yielding a coffee brew that is inconsistent and not optimally flavored with the right blend of solubles. Moreover, the central stream of water will typically push aside grounds immediately below the central stream and generate a pool in the displaced grounds. The pool of water that forms immerses the grounds adjacent to the pool but the static nature of the pool is not beneficial to the extraction of the flavored solubles. Rather, it is desirable to promote turbidity within the grounds environment to move the individual grounds and thereby more fully extract the solubles. Moreover, the typical spray head is made of either a high temperature plastic or stainless steel, which has a porosity that tends to promote the accumulation of scaling and liming.

A discussion of the type of coffee makers that utilize spray heads can be found in U.S. Pat. No. 5,910,205 to Patel, the disclosure of which is incorporated fuilly by reference herein,and U.S. Pat. No. 5,477,775 to Delbom et al., the disclosure of which is incorporated fully by reference herein. Mork, U.S. Pat. No. 6,279,459 incorporated herein by reference, discloses a coffee maker with a rotating grounds basket in an attempt to disperse the water more evenly about the grounds basket. However, the complications associated with a spinning grounds basket make its implementation and use problematic. Dahmen, U.S. Pat. No. 6,244,162 incorporated herein by reference, discloses a coffee making apparatus with a spray head having an inner ring of pores and a ring of pores along an outer edge adapted to spray the grounds in a fan shaped pattern. These disclosures do not adequately address the problem oft he accumulation of lime and scaling at the pores of the spray head. The present invention seeks to overcome the shortcomings of the prior art systems discussed above.

SUMMARY OF THE INVENTION

The present invention is directed to a spray head for a coffee making apparatus that distributes a water flow pattern evenly over a surface area of grounds located below the spray head, and includes a configuration for reducing the accumulation of lime and sedimentation at the spray head exit holes by elevating the inlet of the holes above a lowermost surface. The raised holes allow the formation of lime and scaling to occur below and away from the inlets such that the inlets are not clogged as quickly and maintenance of the spray head can be deferred for longer periods of time. The raised holes are spaced from the lowermost floor by stand pipes having a vertical channel therethrough for communicating water at an accumulation level equal to the height of the stand pipe. The stand pipes can be cylindrical in shape at a base and include a tapered or beveled upper portion leading to the entrance of the vertical channel. The exit of the channel may include a frusto contical annul projection depending downward from the outside surface of the sprinkler member to resist water from adhering to the outside surface. The two-piece spray head of the present invention is preferably made of a polyetherimide material with a low surface porosity to further resist the accumulation of lime and other sedimentary deposits.

These and other features and advantages of the present invention will become apparent from the following detailed description of a preferred embodiment which, taken in conjunction with the accompanying drawings, illustrates by way of example the principles of the invention.

BRIEF DESCRIPTION OF THE DRAWINGS

FIG. 6 is a top view of the preferred embodiment of the present invention shown in FIG. 1;

FIG. 7 is a cross sectional view of the cover of the present invention taken along line A—A of FIG. 6;

FIG. 8 is an enlarged view of the socket of the cover shown in FIG. 6;

FIG. 9 is a sectional cut-away view of the socket of the cover of FIG. 7; and

FIG. 10 is a bottom view of the cover of FIG. 6.

DETAILED DESCRIPTION OF THE PREFERRED EMBODIMENTS

Figure 1:
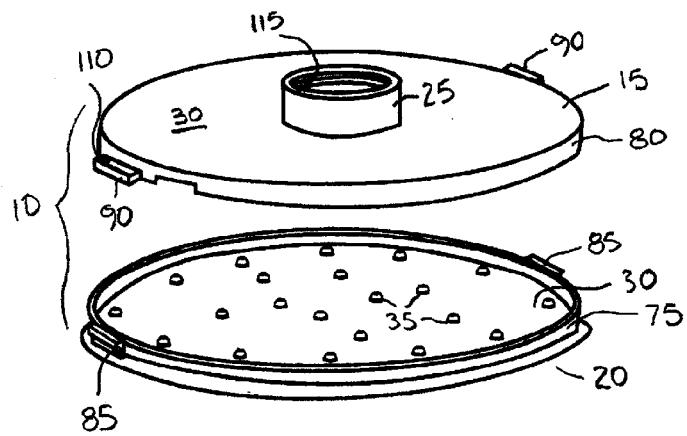
FIG. 1 is an elevated perspective view of a preferred embodiment of the spray head of the present invention in exploded view.
Figure 4:
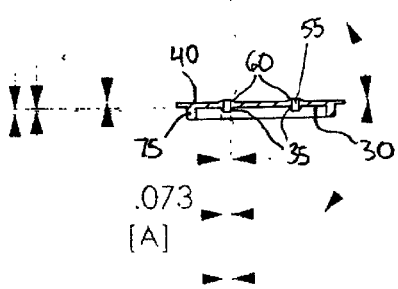
FIG. 4 is a cross sectional view of the sprinkler member taken across line B—B of FIG. 2.

FIG. 1 shows a cover 15 and a sprinkler member 20 that cooperate to form a spray head 10 of the present invention. The cover 15 is circular disk that opens at a threaded inlet flange 25 on the upper surface 30 for receiving an exterior-treaded conduit (not shown) that communicates hot water to the spray head 10. The cover 15 snaps to a sprinkler member 20 and forms a water distribution reservoir inside, where water typically under pressure enters the inlet 25 and collects on the interior surface of the sprinkler member in a pool. The lowermost surface of the sprinkler member can preferably be flat, where the circumferential wall 75 collects the accumulating water and allows the water to pool. The interior sprinkler member includes risers or stand pipes 35 dispersed over the interior surface 30. When the water level in the fluid reservoir rises to the height of the stand pipes 35, water will flow down the stand pipe through holes or channels 55 to distribute the pressurized hot water to a basket of grounds (not shown) positioned below the spray head. The stand pipes are elevated from the interior surface to allow sediment and liming scales to collect on the interior surface 30 away from the openings of the channel 55 to preserve the openings from clogging.

Figure 5:
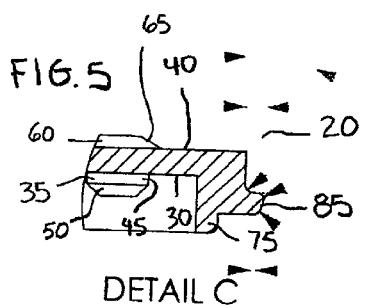
FIG. 5 is a sectional cut-away view of the edge of the sprinkler member and further illustrates the raised holes on the interior surface.

As can be seen in FIGS. 1 and 3—5, the interior surface 30 of the sprinkler member 20 includes a plurality of stand pipes 35 that project upwardly from the interior planar surface 30. For reference it should be noted that the sprinkler member 20 is shown inverted in FIGS. 3—5 from its operational position opposite the cover 15. That is, the interior surface 30 of the sprinkler member faces the bottom of the page in FIGS. 3—5 and the outer surface 40 faces the top of the page. As seen in FIG. 5, the stand pipes 35 comprise a cylindrical base 45 and a tapered or beveled top portion 50 forming a frusto conical end portion extending from the cylindrical base 45. The stand pipe surrounds a channel 55 that passes completely through the sprinkler member 20 to allow water to exit the fluid reservoir and wet the coffee grounds below. The channel 55 can be formed with interchangeable pins during the molding process. The channel 55 is preferably 0.073 inches in diameter and the height of the stand pipe 35 is preferably 0.025 inches. The angular slope of the stand pipe's beveled portion 50 is forty-five degrees and the outer diameter of the stand pipe's cylindrical base 45 is 0.125 inches.

Figure 2:
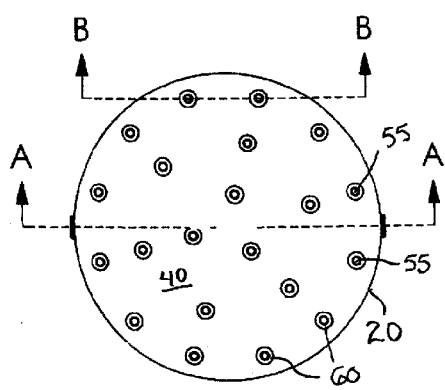
FIG. 2 is a bottom view of the preferred embodiment of FIG. 1.

As seen in FIGS. 2 and 5, the outer surface 40 of the sprinkler, member 20 also includes projections 60 in a frusto conical shape about the exit of channel 55. The projection's taped conical shape limits the exiting water's contact with the lower surface 40 and the water resists collecting on the bottom of the sprinkler member, which keeps the sprinkler member relatively clean and clog free on the outside surface 40. The height of the outer surface's projections are approximately 0.025 inches with an outer diameter of approximately 0.175 inches and an inner diameter of approximately 0.088 inches. The angular slope of the conical portion 65 is thirty degrees. The stand pipes 35 are preferably arranged in a first inner ring, and then radially extending to a second intermediate ring, and further radially extending to an outer third ring spaced circumferentially over the sprinkler member.

The diameter of the channels 55 has been selected to produce a stream of water through the air below the exit at the exterior surface 40 of the sprinkler member 20 for an inch or two, but breaks, up into droplets before reaching the coffee grounds. The breakup of the stream creates multiple, impacts by the falling droplets that move the grounds and introduce turbulence into the grounds basket. A channel diameter too small will break up the stream too early may inhibit the water flow and may reduce the kinetic energy of the falling liquid as it passes through the exit of the channel 55. Conversely, if the water stream does not break up until it reaches the grounds the steady impact of the stream will typically move the grounds away from the point of impact and scatter the grounds without sufficiently wetting the grounds. Accordingly, the selection of the channel diameter is important in creating a stream of water that breaks up at a height sufficiently above the grounds to promote greater turbulence. The preferred channel diameter is 0.073 inches.

Figure 3:
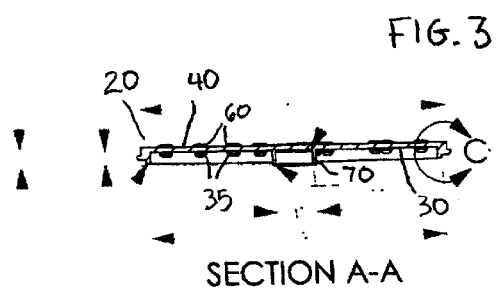
FIG. 3 is a cross sectional view of the sprinkler member taken across line A—A of FIG. 2.

The inner surface 30 of the sprinkler member 20 can also include a centrally disposed cup element 70 shown in FIG. 3. Water from the inlet 25 of the of the cover 15 is partially directed by gravity directly into the cup element 70 and water quickly flows over the edges of the cup element 70 as it fills. The cup forms a first trap for larger impurities that can collect at the bottom of the cup as water rises over the edge of the cup. The flow of water over the edge of the cup also reduces the turbulence in the spray head 10 and thus fewer air bubbles are formed in the fluid reservoir that can impede flow through the channels 55.

The cover 15 and the sprinkler member 20 connect together by a press fit between the circumferential wall 75 of the sprinkler member 20 and the outer circumferential flange 80 of the cover 15. The flange 80 fits tightly over the sprinkler member's wall 75 to provide an initial engagement. The sprinkler member 20 is also provided with lateral bosses 85 (see FIGS. 1 and 5) depending from the circumferential wall 75 that engage and interlock into mating sockets 90 on the cover's outer circumferential flange 80 (see FIG. 9). When snapped together, the bosses 85 on the sprinkler member 20 slide over the inner shoulder 95 leading to the socket's slot 100 and resiliently enter the slot 100. The slot 100 is provided with an opening 105 on the upper surface 110 on the socket 90 such that a screwdriver or other bladed instrument (not shown) can be inserted into the opening 105 to eject the lateral boss from the slot 100 and disengage the cover 15 from the sprinkler member 20.

The inlet 25 to the cover 15 includes a threaded section 115 that leads to a neck portion 120 that tapers radially outward to the inner planar surface 125 of the cover 15. In the radially tapered region of the neck is a plurality of radially directed triangular fins or guides 125 that direct the flow of water radially outward between the guides 125 into discrete radial flow channels 130. The water is communicated to the periphery of the fluid distribution reservoir between the interior surface 125 of the cover 15 and the interior surface 30 of sprinkler member 20 so that it will be passed through the three rings of stand pipes 35 and the grounds below will be wetted uniformly at every angular position. FIG. 10 shows the guides 125 and the radial channels 130 therebetween, where the flow channels 130 are spaced approximately thirty degrees apart radially and are approximately 0.060 inches wide.

In operation, the present invention is connected to a supply line for delivering hot water to the coffee making apparatus. The size of the inlet is selected based on the requirements for the particular coffee brewing machine, and water enters the inlet and passes though the neck into the fluid reservoir between the sprinkler member and the cover. The radial flow channels on the upper surface of the cover immediately below the neck aid in distributing the hot water peripherally to the outside edges of the sprinkler member. Water begins to accumulate in the bottom of the sprinkler member and rise until the level of the water reaches the stand pipe opening. As the water level rises further, water will flow over the upper edge of the stand pipes and pour down the vertical channels out of the spray head. As the water exits the spray head, the frusto conical projections at the exits limit the accumulation of water on the outside surface as the steams of water through the vertical channels exit the spray head. The size of the vertical channel is preferably selected such that the stream of water is continuous through the channel and partially along its trip to the coffee grounds below, whereupon the stream begins to break up into discrete droplets due to interaction with the air molecules. The breakup of the stream into droplets creates distinct impacts on the coffee grounds, promoting turbulence and mixing of the water and coffee grounds. When the supply of water is pressurized, mixing is further promoted by the additional velocity of the liquid above the velocity due to the falling liquid.

While a particular form of the invention has been illustrated and described, it will also be apparent to those skilled in the art that various modifications can be made without departing from the spirit and scope of the invention. Accordingly, it is not intended that the invention be limited except by the appended claims.

What is claimed is:

1. A spray head for spraying hot water over coffee grounds in a brewing apparatus comprising:
   a spray head housing including a cover and sprinkler member defining a water disbursement reservoir;
   said sprinkler member being configured with a plurality of stand pipes arrayed thereabout in substantially uniform spacing; and
   the stand pipes being configured with vertical open channels therethrough for spraying water from the water disbursement reservoir on to the coffee grounds disposed below the spray head whereby water may be introduced to such reservoir under pressure for collection on the sprinkler member until a level is reached at the open channel of the standpipes to permit water to flow downwardly therethrough.

2. The spray head of claim 1 wherein the sprinkler member is formed with a flat upwardly facing surface with the stand pipes rising upwardly therefrom.

3. The spray head of claim 1 wherein the cover comprises a cylindrical inlet centrally disposed on an outer surface and in fluid communication with the fluid receiving reservoir, the inlet further comprising an open upper end and a threaded interior portion extending from the open upper end to a neck within the inlet, the neck tapering radially outward away from the fluid inlet, the tapered neck including radially and downwardly projecting guides defining flow channels therebetween whereby fluid passing through the inlet is partially distributed in the flow channels.

4. The spray head of claim 1 wherein the cover and sprinkler member are made of a polyetherimide material.

5. The spray head of claim 1 wherein the stand pipes comprise a cylindrical base portion at a lower end and a beveled upper end portion at the inlet of the channel.

6. The spray head of claim 1 wherein the sprinkler member further comprises on the outer surface at each of said vertical channels a downwardly projecting frusto conical outlet.

7. The spray head of claim 1 wherein the sprinkler member further comprises an upwardly projecting circumferential rim and a pair of laterally projecting latching lips disposed on an outer surface of the circumferential rim; and the cover member comprises an outer circumferential flange sized to receive the circumferential rim of the sprinkler member therein, including a pair of sockets on the an outer surface of the circumferential flange arranged to receive the laterally projecting lips of the sprinkler member for releasably connecting the sprinkler member to the cover.

8. A spray head for a coffee brewing apparatus comprising:
   a two-piece member defining a chamber for collecting and distributing water having a plurality of outlets disposed along an exterior surface of a bottom member, and further comprising means for drawing water from a depth spaced upwardly from an interior surface of the bottom member to the outlets such that impurities in the water collects on the interior surface away from the means for drawing water.

9. A two-piece spray head for a coffee brewing apparatus comprising:
   a top piece including a centrally disposed inlet and releasable engagement means for coupling the top piece of the two-piece spray head with a bottom piece; and
   a bottom piece including complimentary engagement means for cooperation with the releasable engagement means of the top piece to form a reservoir between said top and bottom pieces, further comprising a substantially planar floor portion traversely extending with respect to the inlet of said top piece having a plurality of standpipes projecting upwardly from said floor portion and defining vertical channels for passing a fluid thereinthrough.

10. The two piece spray head of claim 9 further comprising downwardly projecting frusta-conical members on a lower surface of the floor portion of said bottom piece coinciding with and circling each vertical channel.

* * * * *